Nov. 26, 1968  G. A. DOTTO  3,413,501

ELECTRIC MOTORS

Filed May 31, 1966

INVENTOR
GIANNI A. DOTTO
BY
Robert Genine
ATTORNEY

3,413,501
ELECTRIC MOTORS
Gianni A. Dotto, Dayton, Ohio, assignor to P. R. Mallory & Co., Inc., Indianapolis, Ind., a corporation of Delaware
Filed May 31, 1966, Ser. No. 553,966
12 Claims. (Cl. 310—172)

The present invention relates to improvements in electric motors and more particularly to the means and methods for providing a motor having a pair of separated field coils mounted on a stator for inducing a pair of distinct magnetic fields. Each of the distinct magnetic fields has a distinct closed loop magnetic flux path associated therewith. The direction of each of the flux paths is determined by the shape of the stator and a plurality of shading rings disposed on the stator. A rotor is disposed between each of said field coils and in the path of each magnetic flux path associated with the distinct magnetic fields. As the magnetic fields are changed by an alternating current input, the direction of the magnetic flux changes and, consequently, the rotor rotates. The rotor may be a typical squirrel cage rotor, permanent magnet rotor, or a squirrel cage rotor having a permanent magnet means mounted thereon. The squirrel cage rotor with the permanent magnet means mounted thereon permits the motor to run at a substantially constant speed for given ranges of torque load.

The motor of the present invention is distinguishable over prior art motors because of the double field coil and stator arrangement. Specifically, the motor of the present invention is very compact and provides approximately twice the torque output of a single motor having a single equivalent field coil. In addition, the motor of the present invention is much smaller than a single motor having a single coil for developing the same torque. It will be seen, as this specification progresses, that the stator is constructed so as to have an outer portion and inner portion. After the field coils are mounted on appendages extending into a cut-out in the outer portion, the inner portion is placed in the cut-out. The inner portion has a centrally located circular opening for receiving the rotor.

The motor of the present invention has an important feature which is not found in single field coil motors. This feature is the elimination of radio frequency noise generated by the collapsing and increasing magnetic field. Specifically, since there are two separate and distinct magnet fields involved in the motor of the present invention, the motor can be adapted so that one magnetic field collapses as the other magnetic field increases, thereby cancelling the noise producing effect of a single magnetic field collapsing or increasing. Thus, the motor of the present invention can be used in electronic equipment such as colored television sets, record players and oscilloscopes to drive ventilating fans, turntables, etc.

It is an object of the present invention, therefore, to provide an improved electric motor.

It is another object of the present invention to provide an electric motor having a pair of field coils for providing a pair of distinct magnetic fields.

It is a further object of the present invention to provide a synchronous motor having a pair of field coils for providing a pair of distinct magnetic fields.

It is yet another object of the present invention to provide a motor having a pair of field coils for providing a pair of distinct magnetic fields and a squirrel cage rotor having a permanent magnet means mounted thereon for permitting said motor to operate at a substantially constant speed for given ranges of torque load.

It is another object of the present invention to provide an electric motor which does not generate troublesome radio frequency noise in operation.

It is still another object of the present invention to provide an electric motor having a pair of field coils disposed so as to provide opposing magnetic fields.

It is a further object of the present invention to provide a stator for an electric motor, said stator having a substantially rectangularly shaped outer portion having a centrally located cut-out and a pair of appendages extending into said cut-out and an inner portion disposed in said cut-out and fastened to said appendages.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawing in which.

Generally speaking, the present invention is a motor having a stator with a pair of separated field coils mounted thereon for providing a pair of distinct magnetic fields. A rotor is mounted in an opening in the stator so as to be in the flux paths associated with each of the distinct magnetic fields. The rotor may be a typical squirrel cage rotor, a permanent magnet rotor, or a squirrel cage rotor having a permanent magnet means mounted thereon. The permanent magnet means in combination with a squirrel cage rotor permits the motor to run at a substantially constant speed for a given torque load range. The aforementioned magnetic flux paths are given direction by a plurality of shading rings disposed on the stator. For a given half-cycle input to the field coils, each of the magnetic flux paths act to rotate the rotor. Both field coils are connected to the same alternating current power source and may be connected either in parallel or in series.

Figure 1:
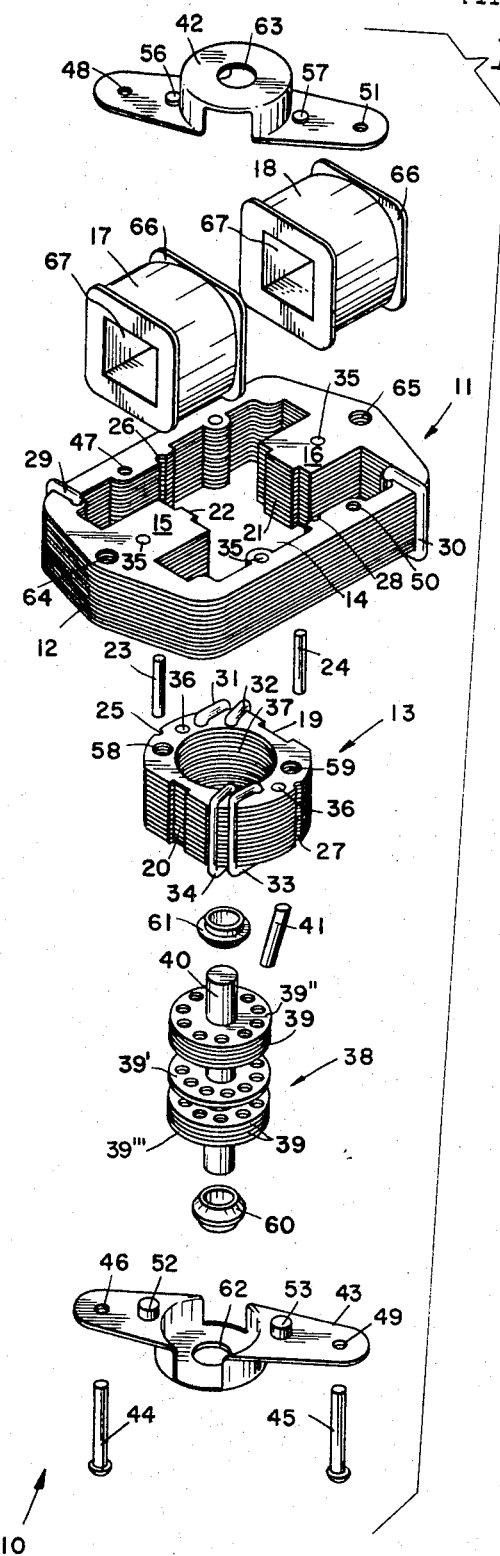
FIGURE 1 is an exploded perspective view of the motor of the present invention.

Referring now to the drawing, and particularly to the exploded perspective view of FIGURE 1, the component parts and structure of the present invention can be visualized in conjunction with the following description.

The main portion of the motor 10 is a stator 11 which is composed of an outer portion 12 and an inner portion 13. The stator portions 12 and 13 are farbricated of laminated soft magnetic material. The stator portion 12 is substantally square shaped having a centrally located cut-out 14. The stator portion 13 fits in the abovementioned cut-out. A pair of appendages 15 and 16 on the stator portion 12 extend into opposite ends of the cut-out 14. A pair of field coils 17 and 18 are mounted on the appendages 15 and 16 respectively.

After the field coils 17 and 18 are mounted on the appendages 15 and 16, the stator portion 13 can be fitted into the cut-out 14 in the stator portion 12. A wide groove 19 and narrow groove 20 are provided on the stator portion 13 for engaging a wide tongue 21 and narrow tongue 22, respectively, on the stator portion 12. A pair of brass pins 23 and 24 are provided for holding the stator portion 13 in position relative to the stator portion 12. The pin 23 engages a groove 25 on the stator portion 13 and a groove 26 on the stator portion 12 and the pin 24 engages a groove 27 on the stator portion 13 and a groove 28 on the stator portion 12.

There are a pair of shading rings 29 and 30 on the stator portion 12 and four shading rings 31, 32, 33, and 34 on the stator portion 13. The shading rings, which may be fabricated out of copper, aluminum, or any suitable conductive material, are adapted to provide the necessary magnetic flux direction for starting and rotating the rotor 38 of the motor 10.

Four rivets 35 are provided for holding laminations of the stator portion 12 together. Two rivets 36 are provided for holding the laminations of the stator portion 13 together.

The stator portion 13 has a circular opening 37 for receiving the rotor 38 of the motor 10.

The rotor 38 is comprised of a plurality of laminated soft magnetic metal rings 39 and copper rings 39″ and 39‴ riveted or pinned together and fixedly mounted on a shaft 40. A typical copper rivet 41 for holding the rings 39 together is illustrated in FIGURE 1.

In one embodiment of the present invention, all of the rings 39 are of the same material as in a typical squirrel cage rotor and, consequently, the motor 10 functions as a typical shaded pole motor. In another embodiment of the present invention, one of the rings 39, identified in FIGURE 1 as 39′ is permanently magnetized so as to provide at least one pair of permanent magnet (north-south) sailent poles. The salient poles permit the motor 10 to operate at substantially constant speeds for a given range of torque loads. In still another embodiment, the rotor may be a permanent magnet member having a plurality of salient magnetic poles. In this embodiment, the motor is a synchronous motor. It can be seen, therefore, that the motor of the present invention can easily be either a typical shaded pole motor or a constant speed motor.

The shaft 40 is supported by two identical bearing mounts 42 and 43 which are affixed to opposite sides of the stator 11 by a pair of rivets 44 and 45. The rivet 44 extends through a hole 46 in the bearing mount 43, a hole 47 in the stator portion 12, and a hole 48 in the bearing mount 42. The rivet 45 extends through a hole 49 in the bearing mount 43, a hole 50 in the stator portion 12, and a hole 51 in the bearing mount 42. There are a pair of alignment pins 52 and 53 on the bearing mount 43 for engaging a pair of alignment holes 54 and 55 in the stator portion 13. (Holes 54 and 55 are not illustrated in FIGURE 1.) There are a pair of alignment pins 56 and 57 on the bearing mount 42 for engaging a pair of alignment holes 58 and 59 in the stator portion 13. A self-aligning bearing 60 is held in a centrally located hole 62 in the bearing mount 43 and is adapted to receive one end of the shaft 40. Another self-aligning bearing 61 is held in a centrally located hole 63 in the bearing mount 42 and is adapted to receive the opposite end of the shaft 40.

A pair of holes 64 and 65 are provided at opposite ends of the stator portion 12 for mounting the motor 10.

The field coils 17 and 18 are fabricated by winding a predetermined number of turns of wire about an insulated spool 66 having a square, centrally located opening 67. The openings 67 are designed to fit over the appendages 15 and 16 on the stator portion 12.

Figure 2:
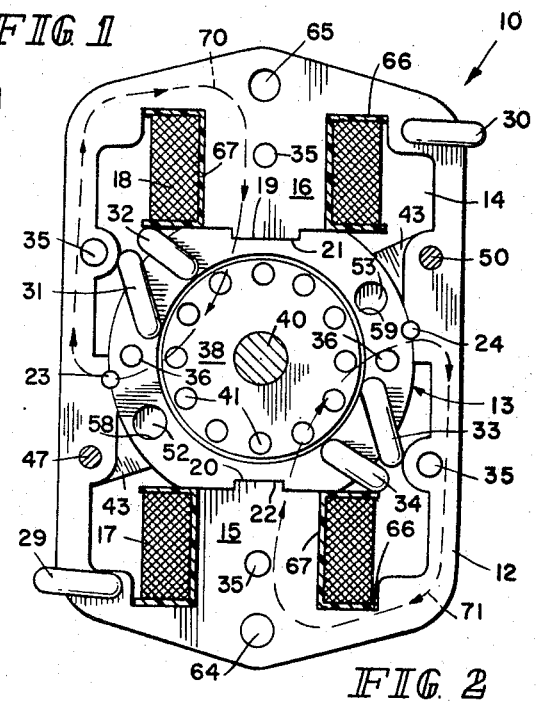
FIGURE 2 is an elevation view of the motor of the present invention wherein a typical squirrel cage rotor application is illustrated.

Referring now to FIGURE 2, an elevation view of the motor 10 having a squirrel cage rotor can be discussed.

The rotor 38 is a typical squirrel cage rotor having a plurality of rings of magnetic material riveted together and mounted on a rotating shaft. The changing magnetic field in the stator causes the rotor 38 to rotate. In the present invention there are two field coils 17 and 18 mounted on the stator 11. The field coils 17 and 18 are adapted so as to provide two separate magnetic fields for imparting rotation to the rotor 38. For instance, on one half-cycle, current flowing through the coil 18 will create a magnetic flux moving generally in the direction of the closed path 70 and current flowing through the coil 17 will create a magnetic flux moving generally in the direction of the closed path 71. As is usual with this type of motor, the magnetic flux paths 70 and 71 will change directions with each half-cycle of the power source coupled to the field coils 17 and 18.

The direction of the magnetic flux paths 70 and 71 is determined by the shape of the stator (portions 12 and 13) and the location of the shading rings 29, 30, 31, 32, 33 and 34. The directing of flux paths by the use of shading rings is well known in the motor art and need not be discussed further in this specification.

The field coils 17 and 18 can be connected in series or in parallel depending on the current requirements of a particular motor.

It may be advantageous to wind and connect the field coils 17 and 18 so that on a given half-cycle, the magnetic fields induced by the coils are of opposite polarity. For instance, on a given alternation, the field coil 18 will induce a north magnetic pole in the direction of the rotor 38 and the field coil 17 will induce a south magnetic pole in the direction of the rotor 38. With this arrangement, the generation of radio frequency noise by the motor as the fields change is eliminated.

As discussed in conjunction with FIGURE 1, the rotor 38 may have a permanent magnet ring 39′ mounted thereon to permit the motor to run at a substantially constant speed for a given range of torque loads.

There may be slight air gaps between the stator portion 12 and the stator portion 13 at the points where they are held by the brass pins 23 and 24. The purpose of the air gap is to provide for dimensional changes due to temperature changes.

Figure 3:
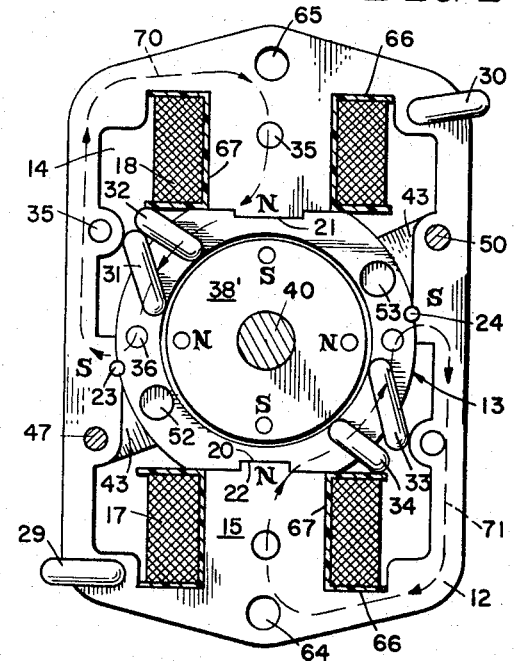
FIGURE 3 is an elevation view of the motor of the present invention wherein a salient pole rotor application is illustrated.

Referring now to FIGURE 3, the motor of the present invention adapted to operate at synchronous speeds can be discussed.

The rotor 38′ of the synchronous motor illustrated in FIGURE 3 has two pairs of permanent magnet salient poles as shown. This is accomplished by permanently magnetizing the proper material in a manner well known in the art. In addition, the field coils 17 and 18 are both arranged so as to induce either a north magnetic pole or a south magnetic pole in the direction of the rotor 38′ for a given half-cycle. For instance, during one half-cycle, the field coil 18 will induce a north magnetic pole as shown and the field coil 17 will induce a north magnetic pole as shown. Therefore, during that half-cycle, the stator-rotor magnetic field orientation will be N–S–S–N. This orientation is illustrated in FIGURE 3.

The field coil 18 produces the flux path 70 and the field coil 17 produces the flux path 71. It will be noted that the flux paths 70 and 71 are not exactly the same as the flux paths obtained for the shaded pole motor illustrated in FIGURE 2.

The operation of the synchronous motor illustrated in FIGURE 3 is typical of small synchronous motors except that a dual closed loop magnetic field is used instead of a single closed loop.

The motor of the present invention produces approximately two times the output torque of a similar motor having a single field coil of the same size. Yet, the motor of the present invention occupies less space than two motors having the same field coil or a single motor having a single field coil twice as big.

A shaded pole motor with a typical squirrel cage motor has been constructed in accordance with the present invention. Each field coil had 2360 turns of #38 AWG wire. The field coils were connected to a 115 volt, 60 cycle per second power source and developed an output torque of 1 in./oz. at 3250 r.p.m.

A substantially constant speed motor was constructed in accordance with the present invention. Each field coil had 2360 turns of #38 AWG wire. The field coils were connected to a 115 volt, 60 cycle per second power source and developed an output torque of 2½ in./oz. at 3600 r.p.m.

A synchronous motor was fabricated in accordance with the present invention. Each field coil had 2360 turns of #38 AWG wire. The field coils were connected to a 115 volt, 60 cycle per second power source and developed an output torque of 4 in./oz. at 1800 r.p.m.

The motor of the present invention, as hereinbefore described, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. A motor comprising: A stator; a pair of field coils disposed on said stator so as to provide a pair of distinct magnetic fields; a plurality of shading rings disposed on said stator so as to define a magnetic flux path associated with each of said distinct magnetic fields; a rotor rotatably mounted on said motor between said field coils and in the path of each of said magnetic flux paths; and means for connecting said field coils to an alternating current power source so as to change the polarity of said magnetic fields with each half-cycle, thereby causing said rotor to rotate.

2. A motor as in claim 1 wherein said stator is comprised of a plurality of pre-shaped metal laminations riveted together.

3. A motor as in claim 1 wherein said stator comprises: an outer portion having a centrally located cut-out and a pair of integrally formed appendages extending into opposite ends of said cut-out; an inner portion disposed in said cut-out and connected to said appendages, said inner portion having a centrally located opening for receiving said rotor; and pin means for centering and holding said inner portion with respect to said outer portion.

4. A motor as in claim 1 wherein said rotor comprises: a shaft; a plurality of magnetic metal rings mounted on said shaft and sandwiched between a pair of copper rings; a plurality of evenly spaced copper pins extending through said magnetic metal rings and copper rings; and permanent magnet means mounted on said shaft in between said magnetic metal rings, said permanent magnet means being angularly disposed so as to provide at least one pair of evenly spaced salient poles.

5. A motor as in claim 1 wherein said rotor is a squirrel cage rotor comprising a plurality of magnetic rings and a pair of copper rings mounted on a shaft, and a plurality of evenly spaced copper pins extending through said magnetic rings and copper rings, said magnetic rings being sandwiched between said copper rings.

6. A motor as in claim 1 wherein said rotor is a permanent magnet member having a predetermined number of pairs of magnetic poles, said permanent magnet member being fixedly mounted on a shaft rotatably mounted on said motor.

7. A motor as in claim 1 wherein said field coils are wound and connected so as to provide magnetic fields of the opposite polarity.

8. A motor as in claim 1 wherein said field coils are wound and connected so as to provide magnetic fields of the same polarity.

9. A motor comprising: a stator comprising an outer portion having a centrally located cut-out and a pair of integrally formed appendages extending into opposite ends of said cut-out, an inner portion disposed in said cut-out and connected to said appendages, said inner portion having a centrally located circular opening, and pin means for centering and holding said inner portion with respect to said outer portion, said pin means extending through corresponding grooves formed in said inner portion and said outer portion; a pair of field coils for providing a pair of distinct magnetic fields, said field coils being mounted on said appendages of said outer portion of said stator; a plurality of shading rings for defining a magnetic flux path associated with each of said distinct magnetic fields, said shading rings being disposed on said stator; a rotor rotatably mounted on said motor so as to extend through said circular opening in said inner portion of said stator, said rotor being in the path of each of said magnetic flux paths; and means for connecting said field coils to an alternating current power source so as to change the polarity of said magnetic fields with each half-cycle, thereby causing said rotor to rotate.

10. A motor as in claim 9 wherein said rotor is a cylindrically shaped permanent magnet member having a predetermined number of evenly spaced poles, said permanent magnet member being concentrically mounted on a shaft, said shaft being rotatably mounted on said motor so as to extend through said circular opening in said inner portion of said stator.

11. A motor as in claim 9 wherein said rotor is a squirrel cage rotor.

12. A motor as in claim 9 wherein said rotor is a squirrel cage rotor having a permanent magnet means mounted thereon so as to provide a plurality of evenly spaced permanent magnet poles.

References Cited

UNITED STATES PATENTS

| | | | |
|---|---|---|---|
| 1,917,289 | 7/1933 | Benson | 310—172 |
| 2,037,606 | 4/1936 | Van Der Woude | 310—172 |
| 2,062,322 | 12/1936 | Lilja | 310—172 |
| 2,071,244 | 2/1937 | Ballentine | 310—172 |
| 2,253,524 | 8/1941 | Lilja | 310—172 |
| 3,191,083 | 6/1965 | Meijer | 310—172 |

J. D. MILLER, *Primary Examiner.*

L. L. SMITH, *Assistant Examiner.*